United States Patent
Fries et al.

(10) Patent No.: US 6,201,296 B1
(45) Date of Patent: Mar. 13, 2001

(54) SEMICONDUCTOR CHIP WITH PROTECTION AGAINST ANALYZING

(75) Inventors: Manfred Fries, Hunderdorf; Peter Stampka, Schwandorf-Klardorf, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/274,501

(22) Filed: Mar. 23, 1999

Related U.S. Application Data

(63) Continuation of application No. PCT/DE97/02039, filed on Sep. 11, 1997.

(30) Foreign Application Priority Data

Sep. 23, 1996 (DE) ............................................. 196 39 033

(51) Int. Cl.[7] ........................ H01L 23/02; H01L 23/58; H01L 29/00
(52) U.S. Cl. ...................... 257/679; 257/922; 257/531; 257/787; 257/788
(58) Field of Search ................................... 257/922, 679, 257/531, 787, 788

(56) References Cited

U.S. PATENT DOCUMENTS

| 4,868,489 | | 9/1989 | Kowalski . | |
| 5,060,261 | * | 10/1991 | Avenier et al. | 257/922 |
| 5,389,738 | | 2/1995 | Piosenka et al. . | |
| 5,710,458 | * | 1/1998 | Iwasaki | 257/679 |
| 5,877,547 | * | 3/1999 | Rhelimi | 257/679 |
| 5,952,713 | * | 9/1999 | Takahira et al. | 257/679 |
| 6,095,424 | * | 8/2000 | Pranez | 257/679 |

FOREIGN PATENT DOCUMENTS

| 4018688A1 | 1/1991 | (DE) . |
| 196 39 033C1 | 8/1997 | (DE) . |
| 0378306A2 | 7/1990 | (EP) . |

OTHER PUBLICATIONS

Published International Application No. 97/36326 (Cole et al.), dated Oct. 2, 1997.

* cited by examiner

Primary Examiner—Mahshid Saadat
Assistant Examiner—Jesse A. Fenty
(74) Attorney, Agent, or Firm—Herbert L. Lerner; Laurence A. Greenberg; Werner H. Stemer

(57) ABSTRACT

A copy-protection device for a semiconductor chip with a cover has a resonant oscillating circuit whose elements are located on the chip surface and within the cover. The semiconductor chip also has an evaluation circuit connected to the oscillating circuit. The evaluation circuit disables the semiconductor chip if the oscillating circuit is detuned and thus stopped from resonating. This detuning of the oscillating circuit occurs when the cover is removed, since the cover acts as a dielectric for the capacitor. After the cover has been removed, it is impossible to operate the semiconductor chip, in order to copy or analyze it.

9 Claims, 1 Drawing Sheet

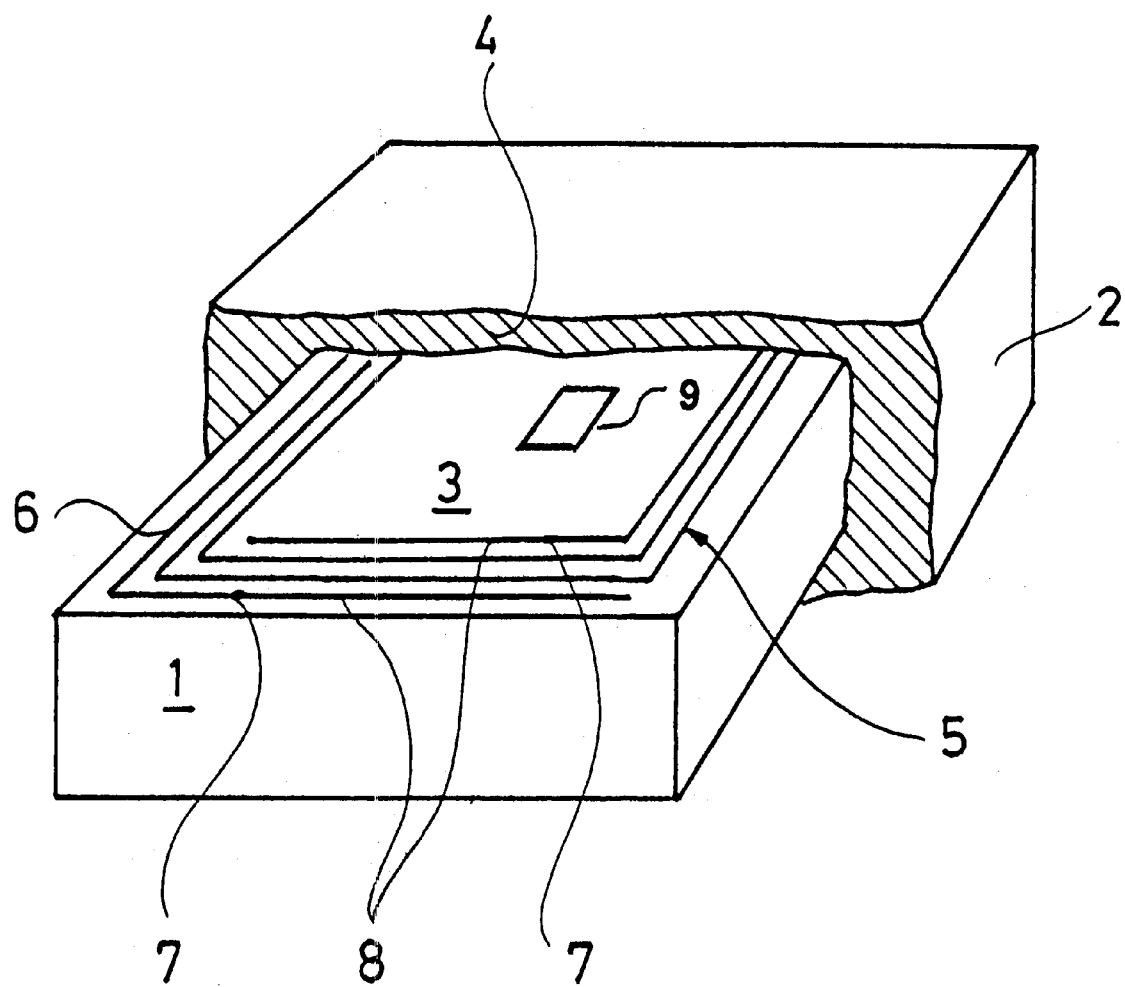

SEMICONDUCTOR CHIP WITH PROTECTION AGAINST ANALYZING

CROSS-REFERENCE TO RELATED APPLICATION

This is a continuation of copending International Application PCT/DE97/02039, filed Sep. 11, 1997, which designated the United States.

BACKGROUND OF THE INVENTION

Field of the Invention

The invention relates to a semiconductor chip having at least one capacitor and an electrically insulating layer that forms a dielectric for the capacitor, as well as an evaluation circuit which disables the semiconductor chip if the layer is removed.

Such a semiconductor chip is known from U.S. Pat. No. 4,868,489. In that patent, the dielectric property of the passivation layer of the semiconductor chip is used in order to make it possible to detect a removal of this passivation layer. However, this detection is carried out only by a direct measurement of the capacitance of two neighboring metallic surfaces.

Published German Patent Application DE 40 18 688 A1 discloses detecting the capacitance, inductance and resistance of a conducting surface, which is applied to the semiconductor chip surface and covers the underlying circuits, in order to make it possible to ascertain when this protective layer has been removed. This involves however determining the capacitance relative to the underlying layers. Furthermore, the inductance of such a surface is very small, so that an evaluation requires circuits which are highly sensitive and therefore elaborate and expensive.

The costs involved in developing an integrated circuit, hereinafter referred to as semiconductor chip, are known to be very high, while production costs, in particular in very large production runs, may be comparatively low. Semiconductor chips are therefore exposed to the risk of being analyzed and copied without permission. For this reason, as already indicated above, various measures have been developed which are intended to prevent unauthorized analyzing of the way in which a semiconductor chip functions, as well as its structure.

SUMMARY OF THE INVENTION

It is accordingly an object of the invention to provide a semiconductor chip with an improved protection against analyzing which overcomes the above-mentioned disadvantages of the heretofore-known semiconductor chips of this general type.

With the foregoing and other objects in view there is provided, in accordance with the invention, a semiconductor device, comprising:
a semiconductor chip having a coil and a capacitor which define an oscillating circuit with a resonant frequency;
an electrically insulating layer forming a dielectric for the capacitor and covering the semiconductor chip; and
an evaluation circuit connected to the oscillating circuit for detecting a detuning of the oscillating circuit due to a change in the resonant frequency caused by altering the electrically insulating layer, the evaluation circuit disabling the semiconductor chip upon detecting the detuning of the oscillating circuit.

In accordance with another feature of the invention, the semiconductor chip has a top surface, at least the coil being formed as a metallic conductor track over the top surface.

In accordance with yet another feature of the invention, the metallic conductor track includes parallel conductor track sections, the capacitor being formed by the parallel conductor track sections.

In accordance with a further feature of the invention, a plurality of oscillating circuits are coupled for oscillating.

In accordance with yet a further feature of the invention, the semiconductor chip has a surface and the coil spans the surface substantially entirely.

In accordance with another feature of the invention, the capacitor substantially entirely occupies the top surface at free surface areas thereof.

In accordance with yet another feature of the invention, the evaluation circuit, after the electrically insulating layer is applied, ascertains the resonant frequency of the oscillating circuit and drives the oscillating circuit during an operation of the semiconductor chip.

In accordance with another feature of the invention, the evaluation circuit drives the oscillating circuit at a preset frequency.

In accordance with yet another feature of the invention, the electrically insulating layer forms a cover for the semiconductor chip, the evaluation circuit detects the detuning of the oscillating circuit when the cover is removed.

The object of the invention is in particular achieved by the semiconductor chip having at least one inductor which, together with the capacitor, forms a resonant oscillating circuit, so that the oscillating circuit is detuned if the resonant frequency of the oscillating circuit changes due to changing the semiconductor chip's cover which forms a layer of dielectric for the capacitor.

A basic idea of the invention is therefore to produce an electrical coupling with the cover, wherein the electrical coupling is needed for the semiconductor chip to function. This coupling is achieved by the fact that the cover forms a necessary element of an oscillating circuit, having an inductor and a capacitor. The cover effects the dielectric constant of the capacitor of the oscillating circuit. If the cover is tampered with, or if the cover is removed, then the semiconductor chip can no longer be operated on account of the detuning of the resonant circuit. However, since operation of the semiconductor chip is a prerequisite for detailed analyzing, reliable protection against analyzing and copying of the semiconductor chip is therefore obtained.

If the cover is removed or modified, the oscillating properties of the oscillating circuit also change. Either the resonant frequency is shifted or the ability to oscillate is lost. In both cases, the oscillating circuit is stopped from resonating and the evaluation circuit permanently disables the semiconductor chip. Security is further increased if there are a plurality of oscillating circuits, which are coupled to one another. An attempt, after removing the cover, to fit a replacement circuit with reconstruction of the tuning is doomed to failure as a result of this measure.

According to a further embodiment of the invention, the evaluation circuit is constructed in such a way that following the application of the cover to conclude the production process of the semiconductor chip, the evaluation circuit automatically ascertains the resonant frequency of the oscillating circuit or circuits and drives them at resonance during the operation of the semiconductor chip. The resonant frequency is determined only once before the semiconductor chip is being used. After any removal of the cover, it is impossible to retune the oscillating circuit or the oscillating circuits as they were originally. In this embodiment, the effect of fabrication tolerances on the tuning of the oscillating circuit or the oscillating circuits is compensated or neutralized since the evaluation circuit according to the invention ascertains the tuning when the semiconductor chip and the cover are in a fully assembled state.

Alternatively, a high security can also be achieved if the evaluation circuit is configured in such a way that it drives the oscillating circuit or the oscillating circuits with a fixed frequency. The fixing of the specific resonant frequency, or the tuning to a standard value by the evaluation circuit, is carried out automatically and cannot be accessed externally.

In principle, the inductor and the capacitor of the oscillating circuit or oscillating circuits may be formed as metallic structures under a hermetically sealing surface layer of the semiconductor chip. Particularly simple production can, however, be achieved if the inductor(s) and capacitor[]s) are applied as metallic conductor tracks directly to the surface layer of the chip. A capacitor will preferably be formed by parallel conductor track sections of an inductor. This has the advantage that the inductor and capacitor can be constructed as a simple geometrical structure.

The sensitivity of the oscillating circuit is preferably increased by an inductor and/or capacitor that spans or occupies the entire chip surface.

Other features which are considered as characteristic for the invention are set forth in the appended claims.

Although the invention is illustrated and described herein as embodied in a semiconductor chip with protection against analyzing, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The single FIGURE of the drawing is a schematic partial sectional view of a semiconductor chip shown in a transparently illustrated package.

DESCRIPTION OF THE PREFERRED EMBODIMENTS

Referring now to the single FIGURE of the drawing in detail, there is seen a semiconductor chip 1 located approximately at the center of a cuboid package or housing 2 which is made of an electrically insulating plastic compound and, with its upper area, forms a cover layer for the top side of the semiconductor chip 1. A cover 4 made of dielectric material is therefore formed over the chip surface 3. Directly on the chip surface 3, a metallic structure 5 is applied which forms an inductor and a capacitor of an oscillating circuit. The inductor is formed by a spiral conductor track 6 with two end terminal points 7 and spans as much as possible of the entire peripheral area of the chip surface 3. The capacitor is formed by parallel dummy conductor track sections 8 of the inductor. The inductor and the capacitor are electrically connected to further components of the resonant oscillating circuit, which are integrated in the semiconductor chip 1.

The semiconductor chip 1 also contains an electronic evaluation circuit 9 which is connected to the resonant oscillating circuit and which disables the semiconductor chip if the resonant oscillating circuit does not properly oscillate as it was intended to.

The dielectric plastic material of the cover 4 sets the value of the capacitance of the capacitor of the resonant oscillating circuit. If the cover 4 is removed, then the capacitance value of the capacitor changes as well since the relative geometrical configuration of dielectric material and capacitor is altered. The associated oscillating circuit is thus stopped from resonating. This fact is ascertained by the evaluation circuit 9 and irreversibly results in disabling the semiconductor chip 1.

We claim:

1. A semiconductor device, comprising:
    a semiconductor chip having a coil and a capacitor defining an oscillating circuit with a resonant frequency;
    an electrically insulating layer forming a dielectric for said capacitor and covering said semiconductor chip; and
    an evaluation circuit connected to said oscillating circuit for detecting a detuning of said oscillating circuit due to a change in said resonant frequency caused by altering said electrically insulating layer, said evaluation circuit disabling said semiconductor chip upon detecting the detuning of said oscillating circuit.

2. The semiconductor device according to claim 1, wherein said semiconductor chip has a top surface, at least said coil being formed as a metallic conductor track over said top surface.

3. The semiconductor device according to claim 2, wherein said metallic conductor track includes parallel conductor track sections, said capacitor being formed by said parallel conductor track sections.

4. The semiconductor device according to claim 1, which further comprises at least a further oscillating circuit coupled to said oscillating circuit for oscillating.

5. The semiconductor device according to claim 1, wherein said semiconductor chip has a surface, said coil spanning said surface substantially entirely.

6. The semiconductor device according to claim 2, wherein said capacitor substantially entirely occupies said top surface at free surface areas thereof.

7. The semiconductor device according to claim 1, wherein said evaluation circuit, after application of said electrically insulating layer, ascertains said resonant frequency of said oscillating circuit and drives said oscillating circuit during an operation of said semiconductor chip.

8. The semiconductor device according to claim 1, wherein said evaluation circuit drives said oscillating circuit at a preset frequency.

9. The semiconductor device according to claim 1, wherein said electrically insulating layer forms a cover for said semiconductor chip, said evaluation circuit detecting the detuning of said oscillating circuit due to a removal of said cover.

* * * * *